Dec. 25, 1951    S. T. KOBERNICK    2,579,932
SEWAGE DISTILLATION PROCESS
Filed Feb. 11, 1948
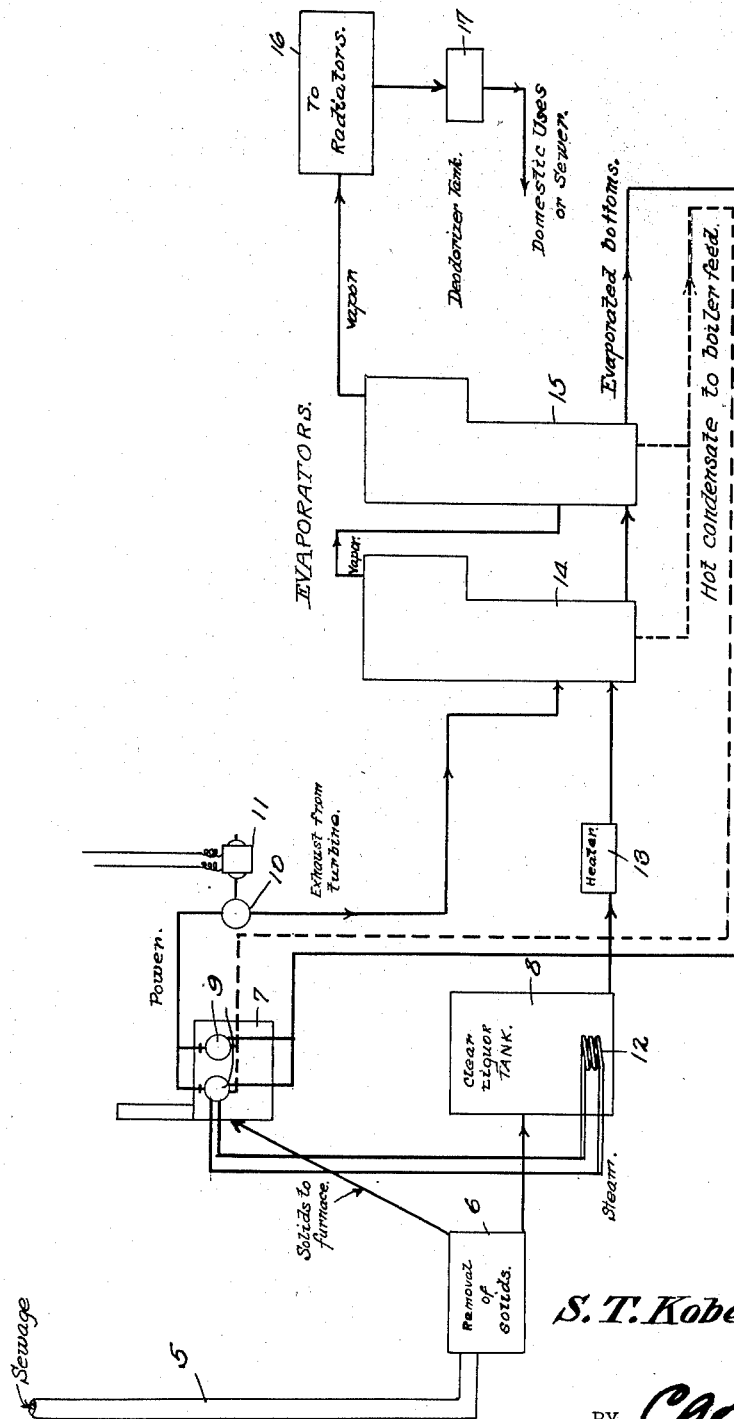
S. T. Kobernick
INVENTOR
BY CA Knowles
ATTORNEYS.

Patented Dec. 25, 1951

2,579,932

UNITED STATES PATENT OFFICE 2,579,932

SEWAGE DISTILLATION PROCESS

Sergius T. Kobernick, Salt Lake City, Utah

Application February 11, 1948, Serial No. 7,690

1 Claim. (Cl. 237—12.1)

This invention relates to a process for sewage regeneration, whereby sewage may by distillation be purified, the water reused, and the solids utilized for developing additional heat in a power plant system.

The problem of sewage disposal has always been a serious one. It is a problem which has been of serious concern not only to municipalities of all sizes, but also to hotels, institutions such as hospitals or the like, and analogous concentrated areas of habitation. The broad overall problem, of disposing of raw sewage, breaks down into subordinate problems each of which must be faced and each of which is in itself a serious matter.

For example, there is the problem of sanitation, which must be reckoned with both before and after processing of the raw sewage for disposal. There is additionally the problem of expense, involving the purchase of fuel, electrical power, manpower, and apparatus required for processing the sewage for disposal. To state another example, there is the not inconsequential problem of disposing physically of sewage masses after they have been processed for disposal.

These problems have been attacked in the past with varying degrees of conscientiousness and efficiency. However, so far as I am aware, no solution has heretofore been offered that will bring forth the results of maximum sanitation, a minimum accumulation of masses at completion of the disposal process, maximum utilization of the sewage, and a minimum of expense to be incurred by the municipality or institution charged with disposal of the sewage.

It is the object of the present invention to produce such a solution.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

The single figure in the drawing represents my process diagrammatically.

In the process, the raw sewage, carried in water, is led to the sewage disposal plant through a sewer or duct 5. The raw sewage will have as its component parts solids, and liquid, and as shown at 6, I first separate these basic component parts. The removed solids are supplied to a furnace 7, while the clear liquor remaining is channeled to a clear liquor tank 8.

Referring to the solids which have been channeled to the furnace 7, these are all used as fuel for the purpose of heating boilers 9. The wastes or ashes accumulating after consumption of the fuel may be sold for fertilizer, plastics production, or gas production, as an offset against the expense incurred for sewage disposal.

The use of the solids for heating the boilers 9 will as will be seen result in sanitary disposition of the solids while at the same time supplementing regular fuels which would otherwise have to be purchased. It is estimated that 5,000 gallon hours of sewage should provide the equivalent, in boiler output, of 10 gallon hours of oil.

The steam supplied by the boilers 9 is now led to a turbine 10, which is preferably a non-condensing bleeder turbine, so that the heat output from the boilers can be balanced between electrical and steam energy.

Electrical energy is now produced, as shown by generator 11, and this electrical power may be utilized both in the sewage disposal plant and for other institutional needs.

Referring to tank 8, the clear liquor therein is being heated by steam coils 12 during utilization of the solids as described above. The steam for the coils 12 is readily adapted to be supplied from boilers 9 if desired. The liquor, leaving the tank 8, may be further heated in heaters 13.

The heated liquor, and the turbine exhaust, are both channeled to multiple effect evaporators designated 14 and 15. As desired, vapor can be produced by the evaporators, and fed to radiators 16 for the purpose of supplying heat for institutional use. If vapor is taken from the evaporators and used for the heat supply, it is channeled, after condensation occurring as a result of such use, to a deodorizer tank 17, after which it is available for any desired domestic uses, or institutional use. It can, for example, be fed to the sewer as a carrying agent for the solids.

Or, if it is not desired that the vapor be taken from the evaporators, the alternative hot condensate occurring after evaporation can be fed to boilers 9 or other boilers for regeneration into steam.

The evaporated bottoms occurring after evaporation are now available for concentration and burning as fuel in furnace 7 or elsewhere. Again, the resulting wastes may be used for fertilizer, plastics manufacture, or gas production.

From the above, it is seen that the sewage disposal process embodied in the invention is in the nature of a complete power-thermodynamic cycle, which accomplishes many desirable and important results. A complete disintegration of sewage, germs, and odors, is accomplished. Additional heat and power is obtained by the municipality, institution, or resort hotel utilizing the process, and these are coincident with a regeneration of a large supply of steam and hot water to be used as desired.

It is further worthy of note, and a part of the invention, that it is possible to cut down the quantity of water effluent to be handled by the filters by inserting after the primary screening operation, a centrifuge to concentrate the flocculent bottoms from the tank immediately following the initial screening operation. By so doing, the volume of matter to be filtered is immensely reduced. Normally, digesters prepare about 2 to 5 percent solids in a sludge which is then filtrable. However, by a centrifuging process, it is contemplated that this concentration might be increased to 10 or 20 percent. Then the solids in the outer shell can be filtered in a much smaller filter and thus an overall saving in equipment and space can be achieved.

What is claimed is:

A process for sewage disposal that includes the steps, first, of separating a mass of raw sewage into its solid and liquid components; then burning all the solids as fuel in a boiler to produce steam; applying heat produced by the boiler to pre-heat all the liquid at the same time said steam is being produced; leading the steam through a turbine; taking hot condensate from the turbine and leading it and the pre-heated liquid to an evaporator simultaneously for joint vaporizing of said condensate and liquid; burning with said solids the residues resulting from said evaporation; feeding the hot condensate resulting from said evaporation into the boiler for steam production; and subjecting the commingled steam and vaporized liquid to conditions to cause condensation thereof.

SERGIUS T. KOBERNICK.

REFERENCES CITED

The following references are of record in the file of this patent:

UNITED STATES PATENTS

| Number | Name | Date |
| --- | --- | --- |
| 1,376,326 | Evans | Apr. 26, 1921 |
| 2,151,079 | Bowen | Mar. 21, 1939 |